United States Patent [19]

Peterson et al.

[11] 3,937,561

[45] Feb. 10, 1976

[54] LIQUID CRYSTAL OPTICAL IMAGE ATTENUATOR

[75] Inventors: Donald W. Peterson; Werner G. Hueber, both of China Lake, Calif.

[73] Assignee: The United States of America as represented by the Secretary of the Navy, Washington, D.C.

[22] Filed: Dec. 2, 1974

[21] Appl. No.: 528,746

[52] U.S. Cl. .................... 350/96 BC; 350/160 LC
[51] Int. Cl.² ..................... G02B 5/17; G02F 1/13
[58] Field of Search ................ 350/160 LC, 96 BC

[56] References Cited
UNITED STATES PATENTS 3,824,604   7/1974   Stein ........................ 350/160 LC X

*Primary Examiner*—John K. Corbin
*Assistant Examiner*—Matthew W. Koren
*Attorney, Agent, or Firm*—R. S. Sciascia; Roy Miller; Gerald F. Baker

[57] ABSTRACT

An image attenuator having an attenuation range of over 100,000. An optical lens device focuses the image on a first liquid crystal layer which scatters the directed light only when an electrical potential is applied to the crystal layer by means of transparent electrodes, and in proportion to the strength of potential applied. A proportion of the scattered light is absorbed within a coherent fiber optic layer, the thickness and the spacing of the individual fibers of which can be varied to vary the contrast and attenuation of the system. Several stages may be stacked in series to obtain a greater degree of attenuation.

7 Claims, 4 Drawing Figures

ATTENUATION RANGE VS ANGULAR ACCEPTANCE ANGLE

3,937,561

LIQUID CRYSTAL OPTICAL IMAGE ATTENUATOR

BACKGROUND OF THE INVENTION

1. Field of the Invention

This invention pertains to liquid crystal optical image attenuators.

Most particularly the invention relates to an optical image attenuator utilizing one or more liquid crystal layers which scatter the directed light when an electrical potential is applied to the layer.

2. Description of the Prior Art

Prior art variable optical attenuators such as iris diaphragms are limited to an attenuation range of about 200:1.

U.S. Pat. No. 1,770,535 to Sukumlyn discloses a variable light refractor in which the refraction is varied by varying voltage applied to a transparent electrolyte and dielectric medium, and in which further refraction can be obtained through the use of multiple stages of the device. U.S. Pat. No. 2,915,943 to Brown et al. discloses a system similar to Sukumlyn but in which the dielectric medium is placed between the two electrodes. U.S. Pat. No. 3,752,897 to Bousky discloses an optical modulator that employs a liquid crystal with electrically controlled refraction and with dissipative materials for dissipating acoustic and extraneous scattered light energies. U.S. Pat. No. 3,622,226 to Matthies discloses a linear array of liquid crystal cells, with transparent electrodes and extraneouslight-absorbing material on its sides. U.S. Pat. No. 3,697,289 to Goldstein discloses a crystal light modulator wherein both aperture and light intensity control is effected.

A discussion of chemical compounds suitable for liquid crystal layers and transparent electrodes usable therewith is contained in U.S. Pat. 3,499,112 issued to G. H. Heilmeier et al. issued Mar. 3, 1970.

SUMMARY OF THE INVENTION

A liquid crystal optical attenuator is capable of an attenuation range greater than 100,000:1 and will function with medium to high resolution images. Attenuation is controllable electrically. Furthermore, the thickness of a single stage of the present invention, about 1mm (or about 8mm total thickness for a seven stage attenuator with an attenuation range of 100,000), is considerably less than a similar attenuator containing collecting apertures. This is important when compactness is a factor.

The present invention is an optical image attenuator with an attenuation range of over 100,000. An optical lens device focuses the image on a first liquid crystal layer which scatters the directed light only when an electrical potential is applied to the layer, by means of transparent electrodes, and in proportion to the strength of potential applied. A proportion of the scattered light is absorbed within a coherent optic fiber plate or layer, the thickness and the spacing of the individual fibers of which can be varied to vary the contrast and attenuation of the system. Several stages may be stacked in series to obtain sufficiently high attenuation.

DESCRIPTION OF THE PREFERRED EMBODIMENT

Figure 1:
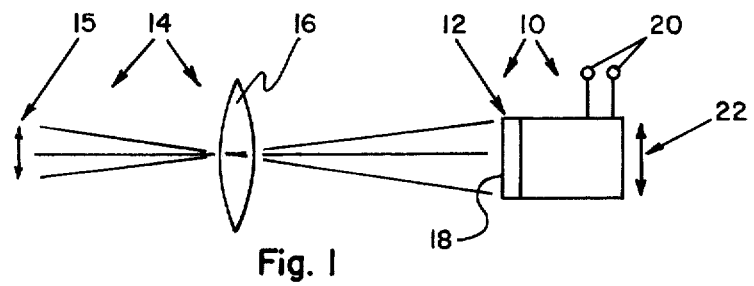
FIG. 1 is a schematic side view of a single stage embodiment of the invention.

In accordance with the invention, as shown in FIG. 1, a liquid crystal optical attenuator (LCOA) 10 is placed at the image plane 12 of an optical system 14 with the image from object 15 focused through lens 16 onto a liquid crystal layer 18. Liquid crystal compositions useful in these devices are characterized by the property of undergoing non-destructive turbulence when an electric current is caused to flow therein. This phenomenon is termed the dynamic scattering effect. An example of a nematic liquid crystal composition having the desired characteristics, for example, is anisylidene-p-aminophenylacetate.

Means for applying a current to the liquid crystal layer is shown at 20 and the attenuated image is indicated at 22.

Figure 2:
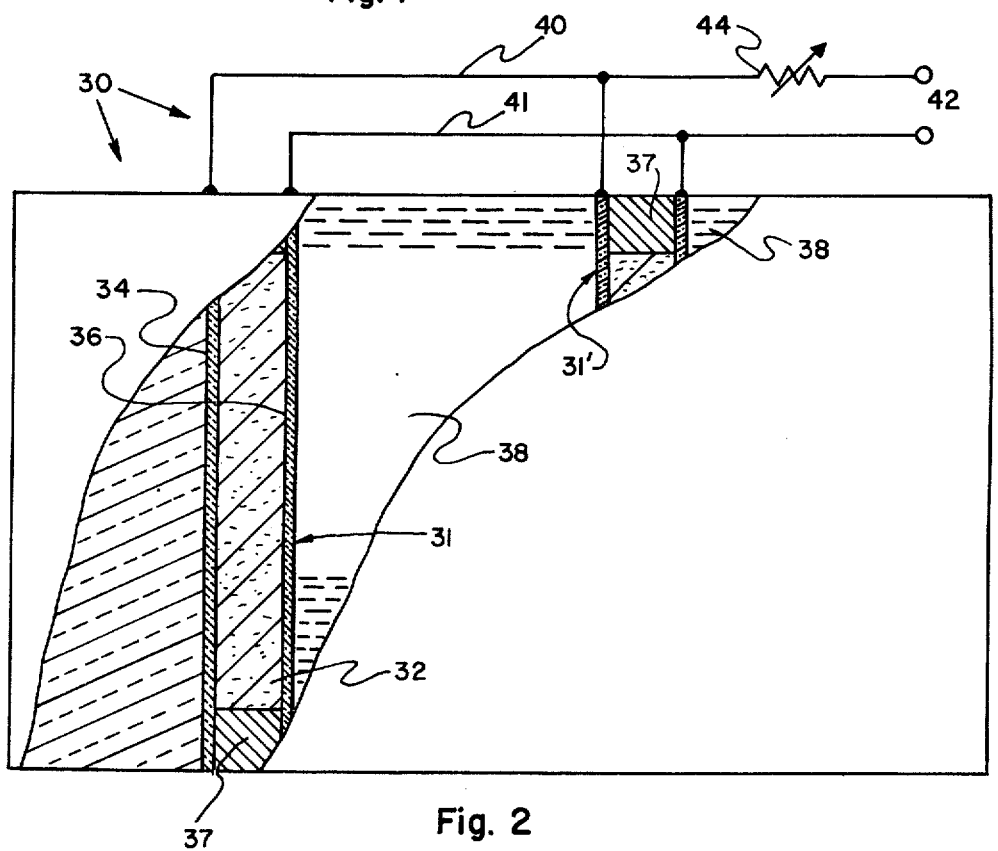
FIG. 2 is a side elevational view partly in section of a two stage embodiment of the invention.

A two stage LCOA 30 is shown in detail in FIG. 2.

This embodiment utilizes two identical liquid crystal optical elements 31 each comprising a liquid crystal layer 32 about 10 microns or micro-meters ($\mu$m) thick confined between two transparent electrodes 34, 36 about 0.5$\mu$m thick. Dimensional stability is provided by peripheral spacers 37 which may be formed, for example, of a plastic material such as Mylar.

The front of unit 30 is protected by a transparent face plate, for example, of glass about 150$\mu$m thick and each liquid crystal layer is followed by an integral fiber optic plate 38. The electrodes may be formed, for example, by coating the respective surfaces of the face plate and the fiber optic plates as needed with tin oxide.

Current is applied in parallel circuit to the electrodes 34, 36 respectively of layers 31, 31' by conductors 40, 41 from source 42 through a variable current limiting means 44. When unactivated, the image passes through the coherent fiber optic layer unattenuated and undeviated in a conventional manner.

When the liquid crystal elements are activated, light is scattered by the liquid crystal layer beyond the acceptance angle of the individual optic fibers and is absorbed within the fiber optic layer. The amount of scattering determines the attenuation and is controlled electrically.

Attenuation, resolution and time response depend on the arrangement of the fiber optic layer and dynamic scattering in the nematic liquid crystal film. In the unactivated state the liquid crystal film is essentially transparent and colorless. Light rays pass through unattenuated and undeviated. In the activated state light is scattered over a wide angular range but is concentrated in the forward direction.

Figure 4:
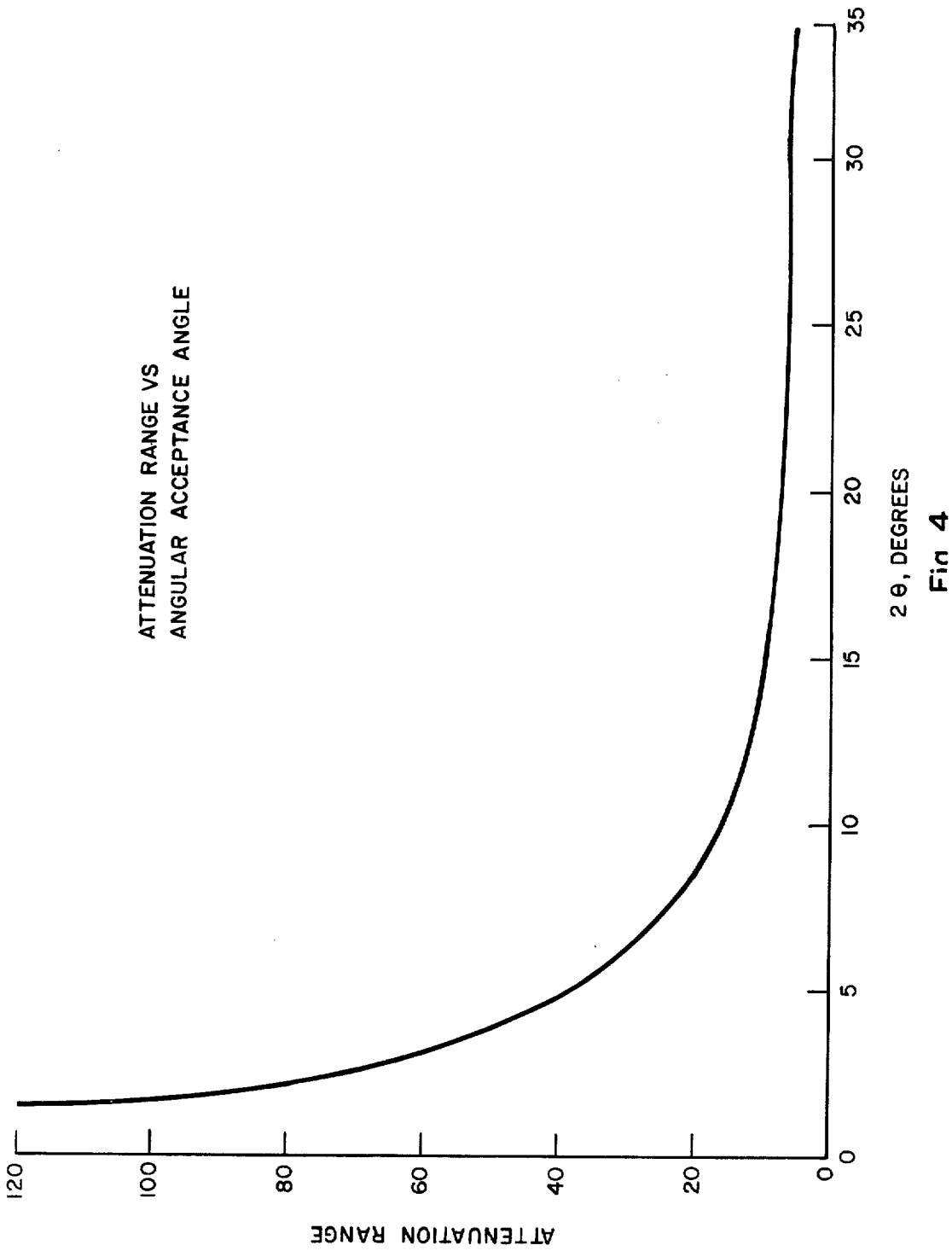
FIG. 4 is a graph of attenuation range versus angular acceptance angle of a collecting aperture.

The attenuation range is a function of the angular acceptance Angle 2$\theta$, as shown in FIG. 4 for 60 v rms at 60 Hz applied across the film. 2$\theta$ is the full angle subtended by the collecting aperture of the optic fiber plate. D.C. Voltage produces approximately the same effect, but the lifetime of the liquid crystal will be shorter.

The angular acceptance angle, 2$\theta$, of the fiber optic plates will determine the attenuation attainable per stage. Acceptance half-angle $\theta$ of fiber optics is related to the numerical aperture (N.A.) by $$N.A. = \sin \theta \qquad \text{Eq. (1)}$$

Since scattering measurements for the liquid crystals are made in air, Eq. (1) is valid. In other cases the relation N.A. $= n \sin \theta$ should be used, where $n$ is the refractive index of the material adjacent the ends of the fiber plate.

Resolution of the LCOA is determined by the pitch $p_F$ of the fiber plate (center to center spacing of the individual fibers) and by the liquid crystal sandwich structure thickness.

Resoluble spot diameter $d_F$ of the fiber plate is determined by:

$$d_F = 2 p_F \qquad \text{Eq. (2)}$$

Figure 3:
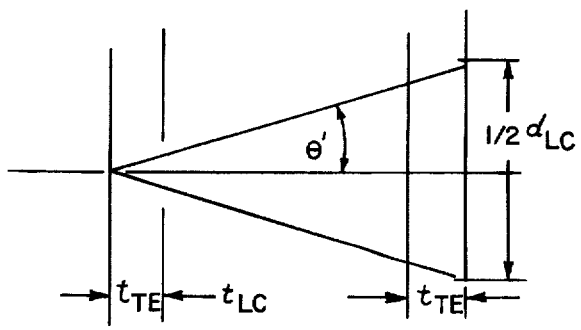
FIG. 3 is a schematic showing the relationship of the acceptance half angle to the structure of the invention.

Resolution due to the liquid crystal sandwich structure thickness is determined from FIG. 3, thusly:

$$d_{LC} = 4(2 t_{TE} + t_{LC}) \tan \theta' \qquad \text{Eq. (3)}$$

where $t_{TE}$ is the thickness of the transparent electrode, $t_{LC}$ is the thickness of the liquid crystal, $$\theta' = \arcsin \frac{\sin \theta}{n}.$$

(by Snell's law), and $n$ is the refractive index of both the liquid crystal material and the transparent electrode. Angle $\theta'$ corrects for the fact that the liquid crystal scattering passes through glass rather than air. Refractive indices of the liquid crystal and transparent electrode are assumed equal.

Resolution of one stage of the LCOA is then, $$D_T{}^2 = d_F{}^2 + d_{LC}{}^2 \qquad \text{Eq. (4)}$$

The attenuation range may be insufficient with one stage. Therefore several stages may be stacked in series. Since registration of fibers from plate to plate is lost, a further resolution degradation occurs;

$$D_{TS} = N D_T \qquad \text{Eq. (5)}$$

where $D_{TS}$ is the resoluble spot size of the stack and $N$ is the number of stages. Resolution in line pairs per unit distance is then, $$R_{TS} = 1/D_{TS} \qquad \text{Eq. (6)}$$

The number of stages required is determined by the maximum total system attenuation range $A_{RT}$ required and by the attenuation attainable per stage. The smallest N. A. available at this time is 0.25 for which $\theta = 14.5°$ by Eq. (1). From the graph of FIG. 3 for $2\theta = 29°$, $A_R = 6$ which is the attenuation range per stage. The required number of stages is $N$ where $6^N = A_{RT}$ and where $A_{RT}$ is the final maximum attenuation required.

As an example, for $A_{RT} = 100{,}000$, $N = 6.4$. Thus seven stages are required. Resolution can then be determined.

For example, assuming the following values:

$p_F = 10 \mu m$
$N.A. = 0.25$
$\theta = 14.5°$
$t_{TE} = 0.5 \mu m$
$t_{LC} = 10.0 \mu m$
$n = 1.5$
$\theta' = 9.6$ whereby with $A_{RT} = 100{,}000$;

$d_F = 20 \mu m$
$d_{LC} = 7.4 \mu m$
$D_T = 21.3 \mu m$
$D_{TS} = 56.4 \mu m$
$R_{TS} = 17.7$ line pairs/mm Thus a small compact LCOA should be achievable with an attenuation range of 100,000 and a resolution of 17.7 line pair s per millimeter or 35 TV lines per millimeter.

Since the fiber optic plate is about 1 mm thick and the other components excluding the face plate aggregate no more than about 0.002mm, size of the LCOA is estimated at about 1mm thickness per stage or about 8mm total thickness for a seven stage attenuator including the front cover glass which is typically 0.15mm thick.

What is claimed is:

1. An electro-optical image attenuator device comprising:
    A. a plurality of serially arranged nematic liquid crystal films of the type that exhibits dynamic scattering when an electric current is caused to flow therein;
    B. conductive means associated with each said film for applying a current producing voltage in parallel to each said film; and
    C. a coherent fiber optic plate adjacent to and following each said film and being composed of a plurality of closely spaced substantially parallel optic fibers orthogonal to said film.

2. The device of claim 1 wherein:
    said conductive means for applying a current producing voltage comprises layers of transparent conductive material adjacent opposite sides of said film and a source of current electrically connected to create a difference of potential between said layers.

3. The device of claim 2 wherein:
    said conductive layers are composed essentially of tin oxide.

4. The device of claim 1 including support means for said film including said fiber optic plate.

5. The device of claim 4 wherein said support means comprises at least one transparent face plate.

6. The device of claim 5 wherein said conductive layers are coated on respective ones of said support means.

7. An electro-optical image attenuator device comprising:
    A. at least one nematic liquid crystal film of the type that exhibits dynamic scattering when an electric current is caused to flow therein;
    B. means for applying a current producing voltage to said film;
    C. a coherent fiber optic plate adjacent to and substantially commensurate with said film and being composed of a plurality of closely spaced substantially parallel optic fibers orthogonal to said film;
    D. support means for said film including said fiber optic plate and a transparent face plate;
    E. said means for applying a current producing voltage comprising transparent layers of conductive material coated on said support means and a source of current electrically connected to create a difference of potential between said layers; and
    F. means for varying the voltage between said layers so that an image passing through the device may be attenuated in proportion to the voltage applied.

* * * * *